(12) United States Patent
Ogata (10) Patent No.: US 7,970,312 B2
(45) Date of Patent: Jun. 28, 2011

(54) IMAGE FORMING APPARATUS

(75) Inventor: Yasunobu Ogata, Nishinomiya (JP)

(73) Assignee: Ricoh Company Limited, Tokyo (JP)

( * ) Notice: Subject to any disclaimer, the term of this patent is extended or adjusted under 35 U.S.C. 154(b) by 77 days.

(21) Appl. No.: 12/607,530

(22) Filed: Oct. 28, 2009

(65) Prior Publication Data

US 2010/0124028 A1    May 20, 2010

(30) Foreign Application Priority Data

Nov. 17, 2008  (JP) ................. 2008-293420

(51) Int. Cl.
*G03G 15/00* (2006.01)
(52) U.S. Cl. .................. 399/110; 399/111; 399/119
(58) Field of Classification Search .................. 399/107, 399/110, 111, 119, 124
See application file for complete search history.

(56) References Cited

U.S. PATENT DOCUMENTS

| | | | |
|---|---|---|---|
| 7,065,311 B2 * | 6/2006 | Okabe | 399/111 |
| 7,330,679 B2 * | 2/2008 | Kweon | 399/111 |
| 2008/0193162 A1 | 8/2008 | Yamazoe et al. | |

FOREIGN PATENT DOCUMENTS

| | | |
|---|---|---|
| JP | 2000-338822 | 12/2000 |
| JP | 2004-272289 | 9/2004 |
| JP | 2006-84814 | 3/2006 |
| JP | 2007-163665 | 6/2007 |
| JP | 2008-70522 | 3/2008 |

* cited by examiner

*Primary Examiner* — Hoang Ngo
(74) *Attorney, Agent, or Firm* — Oblon, Spivak, McClelland, Maier & Neustadt, L.L.P.

(57) ABSTRACT

An image forming apparatus includes a main body, an openable/closable cover panel, a unitary assembly, a holder, and a fastener. The openable/closable cover panel covers an opening in the main body. The unitary assembly is detachably attached to an inner side of the cover panel. The fastener fastens the assembly in place on the cover panel. The holder includes a positioning surface and first and second guide surfaces to hold the assembly on the cover panel. The positioning surface receives a positioning pin projecting from the assembly. The first and second guide surfaces are disposed on opposite sides of the positioning surface, and each guide surface slidably guides the positioning pin onto the positioning surface. The second guide surface is elastically displaceable to cause the positioning pin to slide off onto the positioning surface as the positioning pin presses against the second guide surface.

12 Claims, 10 Drawing Sheets

IMAGE FORMING APPARATUS

CROSS-REFERENCE TO RELATED APPLICATIONS

The present patent application claims priority pursuant to 35 U.S.C. §119 from Japanese Patent Application No. 2008-293420 filed on Nov. 17, 2008, which is hereby incorporated by reference herein in its entirety.

BACKGROUND OF THE INVENTION

1. Field of the Invention

The present invention relates to an image forming apparatus, and more particularly, to an image forming apparatus, such as a printer, photocopier, facsimile, and multifunctional machine incorporating several of these functions.

2. Discussion of the Background

Electrophotography is employed in various image forming apparatuses, such as printers, photocopiers, facsimiles, and multifunctional machines incorporating several of those imaging functions, in which a latent image is formed by selectively discharging a photoconductive surface, and then is developed into a visible image with toner electrostatically attracted to the photoconductive surface.

One electrophotographic imaging process commonly used is an intermediate transfer process that performs color printing by primarily transferring toner images of different colors to a single area of an intermediate transfer member to obtain a multicolor image, and subsequently secondarily transferring the multicolor toner image from the intermediate transfer member to a recording medium such as a sheet of paper. Typically, an intermediate transfer type image forming apparatus incorporates various pieces of imaging equipment to perform specific imaging functions, several of which are integrated into unitary assemblies or modules removably installed in a main body of the image forming apparatus.

Figure 1:
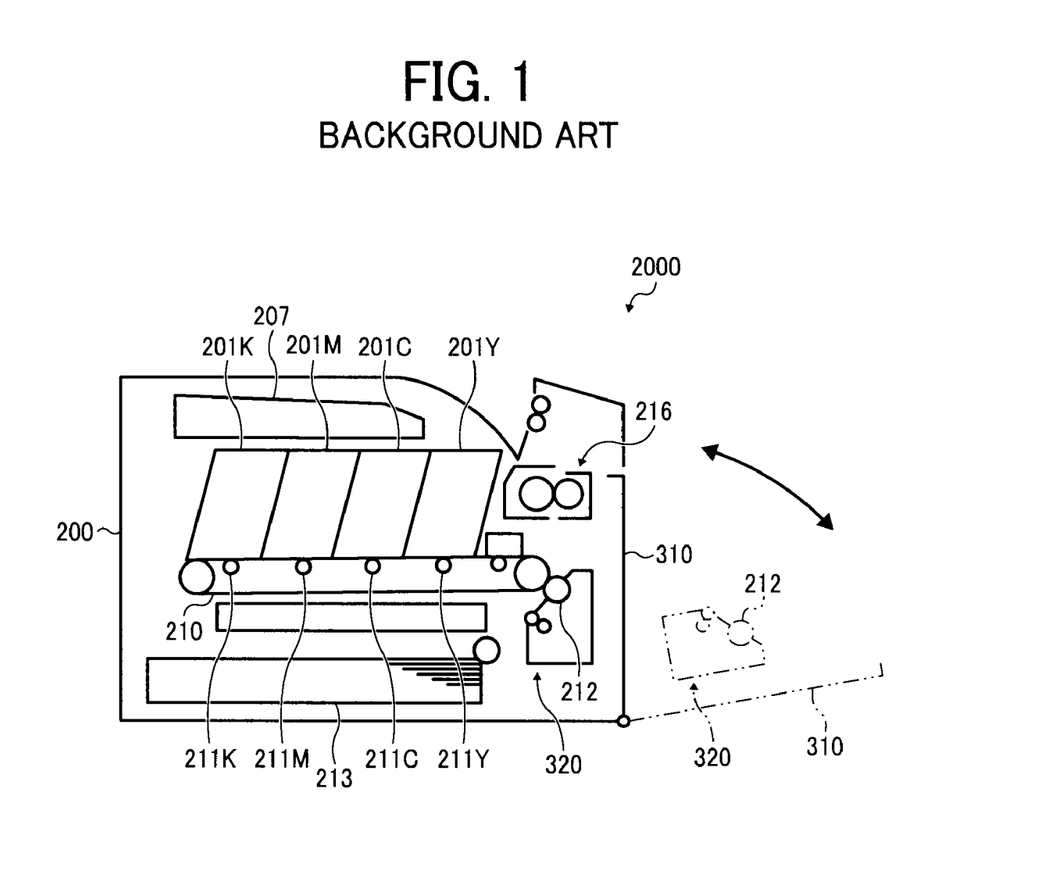
FIG. 1 schematically illustrates a conventional electrophotographic image forming apparatus.

FIG. 1 schematically illustrates a conventional electrophotographic image forming apparatus 2000 employing an intermediate transfer process with various imaging components enclosed in a main apparatus body 200.

As shown in FIG. 1, the image forming apparatus 2000 includes a set of multiple imaging units 201Y, 201C, 201M, and 201K (collectively designated by reference numeral 201) arranged in series in the middle of the apparatus body 200, each having a set of various imaging devices, such as a photoconductor, a charging device, a development device, etc., all of which are accommodated within a single housing for removable installation in the image forming apparatus 2000. The image forming apparatus 2000 also includes an intermediate transfer belt 210 looped along the series of imaging units 201 for rotation around a set of multiple primary transfer rollers 211Y, 211C, 211M, and 211K, with its outer surface in contact with a secondary transfer roller 212. Each primary transfer roller 211 is associated with one of the imaging units 201 to form a primary transfer nip with the photoconductor of the associated imaging unit 201. The secondary transfer roller 212 forms a secondary transfer nip with a roller located within the loop of the intermediate transfer belt 210.

In addition to the imaging and intermediate transfer units, the image forming apparatus 2000 includes an exposure unit 207 and a fixing unit 216, each disposed in an upper portion of the apparatus body 200, as well as a media tray 213 disposed at the bottom of the apparatus body 200 to accommodate a stack of recording media.

During operation, the image forming apparatus 2000 initially forms toner images of different colors on the photoconductors of the respective imaging units 201. In each imaging unit 201, the photoconductor has its outer surface initially charged by the charging device to a substantially uniform electric potential. The photoconductive surface is subsequently irradiated by the exposure unit 7 to form an electrostatic latent image thereon, followed by the development device applying toner to the latent image to render it into a visible toner image.

Each of multiple toner images formed through such imaging processes is then transferred onto the intermediate transfer belt 210 at the primary transfer nip, where the primary transfer roller 211 generates an electrostatic transfer field to attract toner from the photoconductive surface toward the belt surface. As the intermediate transfer belt 210 rotates to sequentially pass through the primary transfer nips, the multiple toner images transferred are superimposed one atop another in a single area of the belt surface to form a single multicolor image.

The combined toner image formed on the rotating belt 210 reaches the secondary transfer nip for transfer onto a recording medium fed from the media tray 13, where the secondary transfer roller 212 generates an electrostatic transfer field to attract toner from the belt surface to the recording medium surface. Thereafter, the recording medium bearing the powder toner image thereon is forwarded to the fixing unit 216, which fixes the toner image in place on the recording medium with heat and pressure, and then to an output tray disposed atop the apparatus body 200 to complete one printing cycle.

With continued reference to FIG. 1, the image forming apparatus 2000 has an openable/closable cover panel 310 to cover an opening defined in a front side of the apparatus body 200. The cover panel 310 is hinged along a front bottom edge of the apparatus body 200 and can rotate between an inclined, open position (represented by dotted lines) and an upright, closed position (represented by solid lines). As can be seen from the drawing, the cover panel 310 is combined with a media feeder assembly 320, wherein the secondary transfer roller 212 and several components involved in feeding recording media from the media tray 213 are assembled into a single unit detachably attached to an inner side of the cover panel 310 with certain holder and locking equipment, not shown.

The media feeder assembly 320 attached to the cover panel 310 is set to a proper operational position by closing the cover panel 310, and is separated from the apparatus body 200 by opening the cover panel 310. This enables a user to directly access the interior of the image forming apparatus 2000 through the opening solely by opening the cover panel 310, which facilitates mounting and dismounting of internal units (such as one containing the intermediate transfer belt 210) during repair or replacement, and removal of recording media jammed between the secondary transfer roller 212 and the intermediate transfer belt 210 during ordinary use.

Moreover, the media feeder assembly 320 can be detached from the cover panel 310 in the open position by disengaging the holder and locking members attaching it to the cover panel 310. This enables ready removal of internal components from the apparatus body 200 without interfering with or damaging the assembly 320, allowing for safe and easy maintenance of the image forming apparatus 2000.

One problem encountered by such an image forming apparatus with its process assembly attached to an openable/closable cover panel is that an inexperienced user often fails to properly mount the assembly to the cover panel and closes the cover panel without noticing the mounting failure. This often causes damage to holders and/or fasteners attaching the assembly to the cover panel, and the assembly improperly positioned with respect to surrounding components leads to malfunction or failure of the image forming apparatus.

Hence, what is needed is an image forming apparatus with a mounting mechanism with increased usability and functionality that allows a user to properly mount a process assembly to an openable/closable cover panel, and prevents damage to the image forming apparatus due to improper mounting of the assembly in the apparatus body.

SUMMARY OF THE INVENTION

Exemplary aspects of the present invention are put forward in view of the above-described circumstances, and provide a novel image forming apparatus with a mounting mechanism to mount a process assembly to an openable/closable cover panel.

In one exemplary embodiment; the novel image forming apparatus includes a main body, an openable/closable cover panel, a unitary assembly, a holder, and a fastener. The main body has an opening to provide access to an interior thereof. The openable/closable cover panel covers the opening of the main body. The unitary assembly is detachably attached to an inner side of the cover panel to settle into an operational position by contacting the interior of the main body as the cover panel closes. The fastener fastens the assembly in place on the cover panel. The holder includes a positioning surface and first and second guide surfaces to hold the assembly on the cover panel. The positioning surface receives a positioning pin projecting from the assembly. The first and second guide surfaces are disposed on opposite sides of the positioning surface, and each guide surface slidably guides the positioning pin onto the positioning surface. The second guide surface is elastically displaceable to cause the positioning pin to slide off onto the positioning surface as the positioning pin presses against the second guide surface due to pressure acting on the assembly to press the assembly against the cover panel.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

In describing exemplary embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, exemplary embodiments of the present patent application are described.

Figure 2:
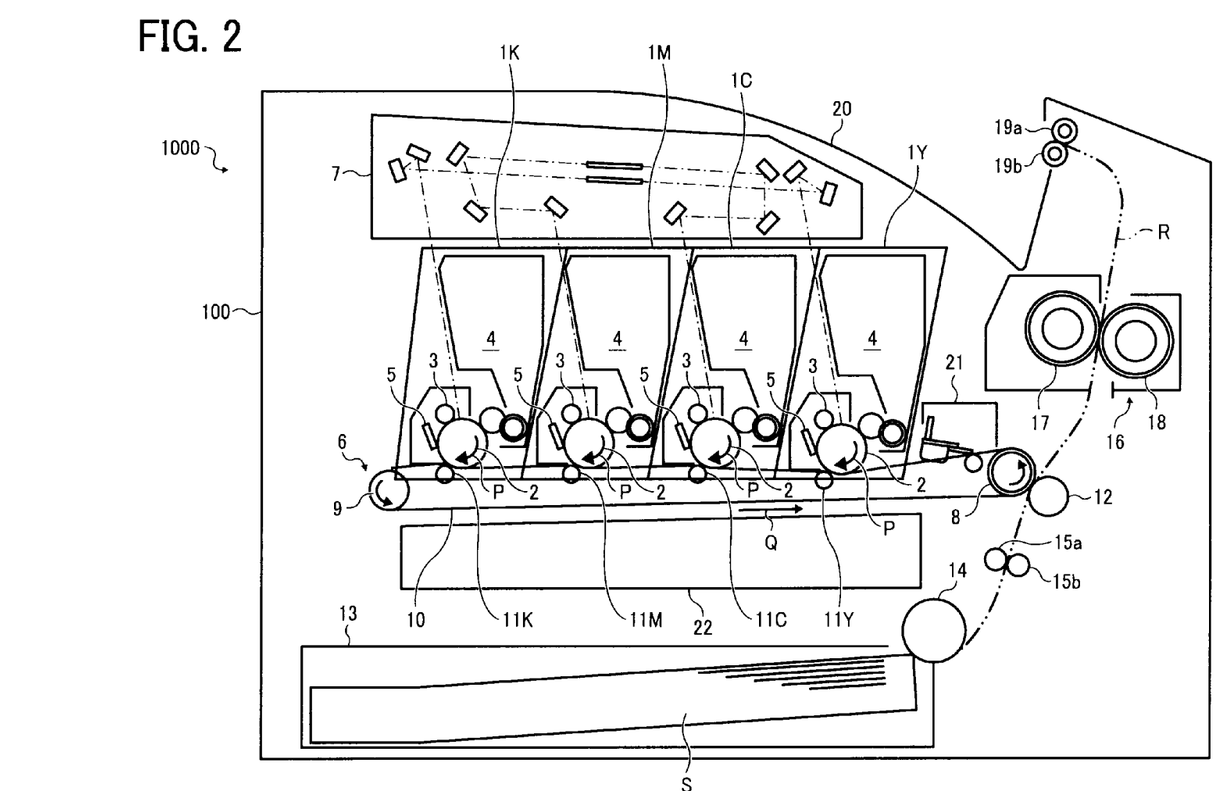
FIG. 2 schematically illustrates an electrophotographic image forming apparatus according to one embodiment of this patent specification.

FIG. 2 schematically illustrates an electrophotographic image forming apparatus 1000 according to one embodiment of this patent specification.

As shown in FIG. 2, the image forming apparatus 1000 includes a series of imaging units 1Y, 1C, 1M, and 1K (collectively designated by reference numeral 1), an intermediate transfer unit 6, an exposure unit 7, a media tray 13, and a fixing unit 16, all enclosed in a main apparatus body 100. Although not depicted in FIG. 2, the image forming apparatus 1000 incorporates a mounting mechanism for detachably attaching a process assembly to an openable/closable cover panel covering an opening of the apparatus body 100 as will be described later in more detail.

In the image forming apparatus 1000, the imaging units 1Y, 1C, 1M, and 1K are removably installed in the apparatus body 100 to form toner images of different primary colors as indicated by the suffix letters, "Y" for yellow, "C" for cyan, "M" for magenta, and "K" for black. Except for the color of toner used for image formation, the four imaging units 1 are identical to each other in basic configuration and operation, each having a drum-shaped photoconductor 2 rotatable in the direction of arrow P with its outer surface surrounded by a charging roller 3, a development device 4, and a cleaning blade 5.

Above the series of imaging units 1 lies the exposure unit 7, and below lies the intermediate transfer unit 6. The intermediate transfer unit 6 has an intermediate transfer belt 10 looped around a drive roller 8 and a driven roller 9 for rotation along an endless belt travel path, wherein the drive roller 8 imparts driving force to rotate the belt 10 in the direction of arrow Q and the driven roller 9 maintains proper tension on the rotating belt 10.

Within the loop of the intermediate transfer belt 10 are a series of primary transfer rollers 11Y, 11C, 11M, and 11K, each supporting the inner surface of the belt 10 where the photoconductor 2 is pressed against the outer surface of the belt 10 to define a primary transfer nip therebetween. Downstream of the primary transfer nips and beside the belt loop is a secondary transfer roller 12 pressed against the outer surface of the belt 10 where the drive roller 8 supports the inner surface of the belt 10 to define a secondary transfer nip therebetween.

Further, the intermediate transfer unit 6 is equipped with a belt cleaner 21 for removing residual toner from the surface of the intermediate transfer belt 10 and a waste toner container 22 for accommodating toner removed from the belt surface, which are connected via a delivery tube, not shown, extending from above to below the intermediate transfer unit 6 to conduct toner from the belt cleaner 21 down to the waste toner container 22.

The fixing unit 16 is located adjacent to the intermediate transfer unit 6, and includes a heat roller 17 and a pressure roller 18 pressed against each other to define a fixing nip therebetween.

The media tray 13 holds a stack of recording media S, such as sheets of paper or transparency film, at the bottom of the apparatus body 100. The media tray 13 has a pickup roller 14 and other sheet feeding members to forward a recording sheet S into a sheet feed path R along which the fed sheet S travels upward between a pair of registration rollers 15a and 15b, then through the secondary transfer nip and the fixing nip, and then between a pair of output rollers 19a and 19b to finally settle in an output tray or surface 20 sloping upward away from the end of the sheet feed path R at the top of the apparatus main body 100.

During operation, each imaging unit 1 forms a toner image of a particular primary color on the surface of the photoconductor drum 2 rotating in the direction of arrow P. First, the photoconductive surface is charged by the charging roller 3 to a substantially uniform, relatively high electric potential, and is subsequently irradiated with a laser beam emitted from the exposure device 7 selectively dissipating charges to form an electrostatic latent image according to image data. The latent image formed on the rotating photoconductive surface is then developed into a visible toner image by the development device 4 electrostatically adhering charged toner particles to the incoming latent image. The toner image thus obtained on the rotating photoconductive surface is forwarded to the primary transfer nip.

At the primary transfer nip, the toner image is transferred from the photoconductive surface to the intermediate transfer belt 10 rotating in the direction of arrow Q, where a constant-voltage or constant-current bias of a polarity opposite that of the charged toner particles is applied to the primary transfer roller 11 to establish an electrical field. After primary transfer, the photoconductive surface is cleaned of residual toner with the cleaning blade 5, and then of residual charges with a discharging lamp, not shown, in preparation for a subsequent imaging cycle.

Such imaging and primary transfer processes are performed in each imaging unit 1, so that multiple toner images are superimposed one atop another to form a multicolor toner image on the intermediate transfer belt 10. As the intermediate transfer belt 10 rotates, the toner image proceeds to the secondary transfer nip along the belt travel path.

Meanwhile, the pickup roller 14 introduces a recording sheet S into the sheet feed path R, in which the registration rollers 15a and 15b hold the incoming sheet S before forwarding it to the secondary transfer nip in sync with the toner image traveling on the rotating intermediate transfer belt 10.

At the secondary transfer nip, the composite toner image is transferred from the intermediate transfer belt 10 to the recording sheet S where a bias voltage of a polarity opposite that of the charged toner particles is applied to the secondary transfer roller 12 to establish an electrical field. Alternatively, an electrical field may be established by applying a bias voltage of the same polarity as the toner particles to the drive roller 8.

After secondary transfer, the belt cleaner 21 removes residual toner from the belt surface and discharges it to the delivery tube for collection in the waste toner container 22. The recording sheet S passing the secondary transfer nip advances to the fixing device 16, in which the powder toner image is permanently fixed in place on the sheet surface with heat and pressure applied to the recording sheet S passing through the fixing nip. The recording sheet S exiting the fixing device 16 is output to the output tray 20 through the output rollers 19a and 19b to complete one operational cycle of the image forming apparatus 1000.

Figure 3:
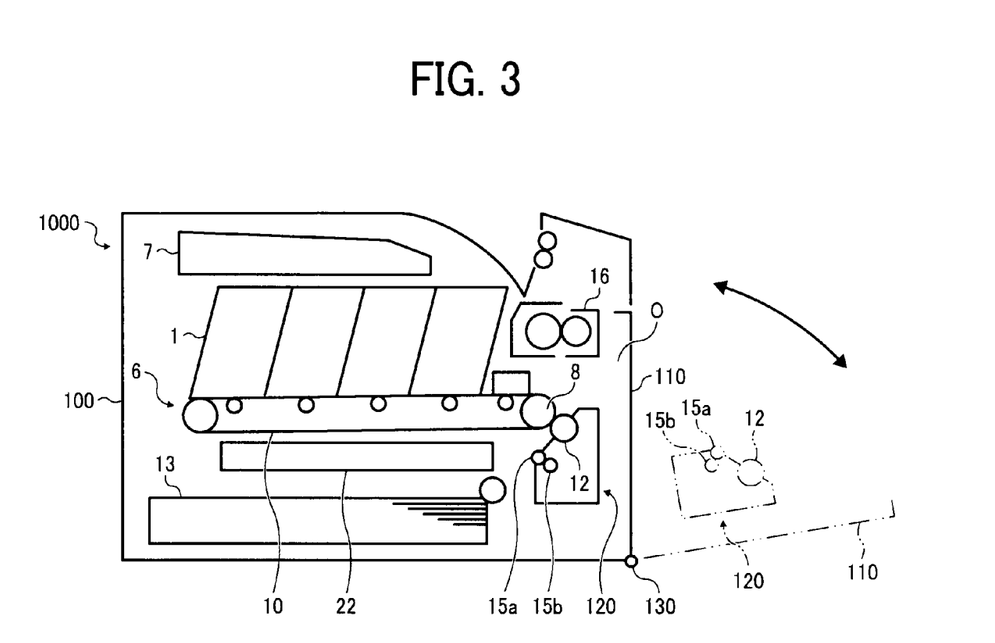
FIG. 3 is a simplified diagram of the image forming apparatus of FIG. 2 incorporating a mounting mechanism to mount a media feeder assembly to a front cover panel.

FIG. 3 is a simplified diagram of the image forming apparatus 1000 incorporating the mounting mechanism noted above according to this patent specification.

As shown in FIG. 3, the image forming apparatus 1000 has an openable/closable cover panel 110 to cover an opening O in a front side to provide access to an interior of the main apparatus body 100 (shown on the right in the drawing). The front cover panel 110 is combined with a unitary assembly 120 in which several pieces of process equipment involved in the image forming apparatus 1000 are integrated into a single unit detachably attached to the cover panel 110, which, in the present embodiment, comprises a media feeder assembly integrally holding the secondary transfer roller 12 and the pair of registration rollers 15a and 15b forming part of the media feed path.

As used herein, terms indicating direction or orientation, such as "front", "rear", "top", "bottom", "right", "left", and the like, refer to relative positions of elements as viewed from a user looking into the opening O of the image forming apparatus 1000 on the front side. These relative positional terms are only for illustrative purposes, and the cover panel 110 may be provided on any appropriate portion of the apparatus body 100 providing access to the interior of the apparatus body 100.

Specifically, the front cover panel 110 is connected to a front bottom edge of the apparatus body 100 and hinged thereto for pivoting about a hinge 130 between an upright, closed position (represented by solid lines) and an inclined, open position (represented by dotted lines). The media feeder assembly 120 is detachably attached to an inner side of the cover panel 110 for movement with the cover panel 110 being opened and closed.

Thus, moving the cover panel 110 to the closed position moves the assembly 120 toward the apparatus body 100, setting it to a proper operational position with its components (such as the secondary transfer roller 12) directly or indirectly contacting the internal structure of the image forming apparatus 1000. Conversely, moving the cover panel 110 to the open position separates the assembly 120 from the apparatus body 100, i.e., away from proximity to the intermediate transfer unit 6 and the waste toner container 22. Such a configuration enables a user to directly access the interior of the apparatus body 100 through the opening O simply by opening the cover panel 110, for example, when removing a recording sheet improperly fed and jammed in the secondary transfer nip, or when mounting or dismounting internal units, such as the intermediate transfer unit 6 and the waste toner container 22, during repair or replacement.

Moreover, the media feeder assembly 120 can be detached from the cover panel 110 for removal from the apparatus body 100 when the cover panel 110 is open. This enables ready removal of internal components through the opening O without interfering with or damaging the assembly 120, allowing for safe and easy maintenance of the image forming apparatus 1000.

Figure 4:
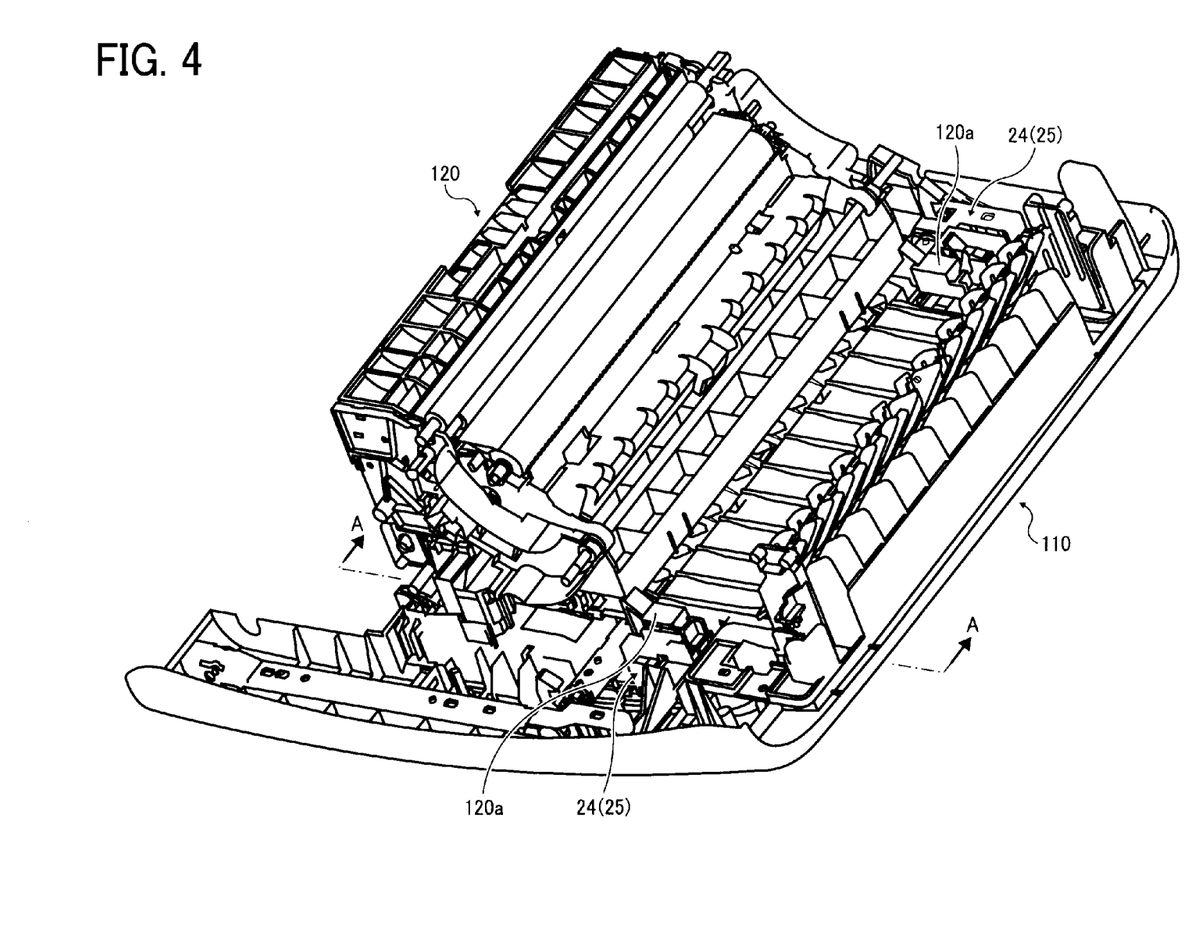
FIGS. 4 and 5 are perspective views showing the front cover panel with and without, respectively, the media feeder assembly attached thereto using the mounting mechanism incorporated in the image forming apparatus of FIG. 2.
Figure 5:
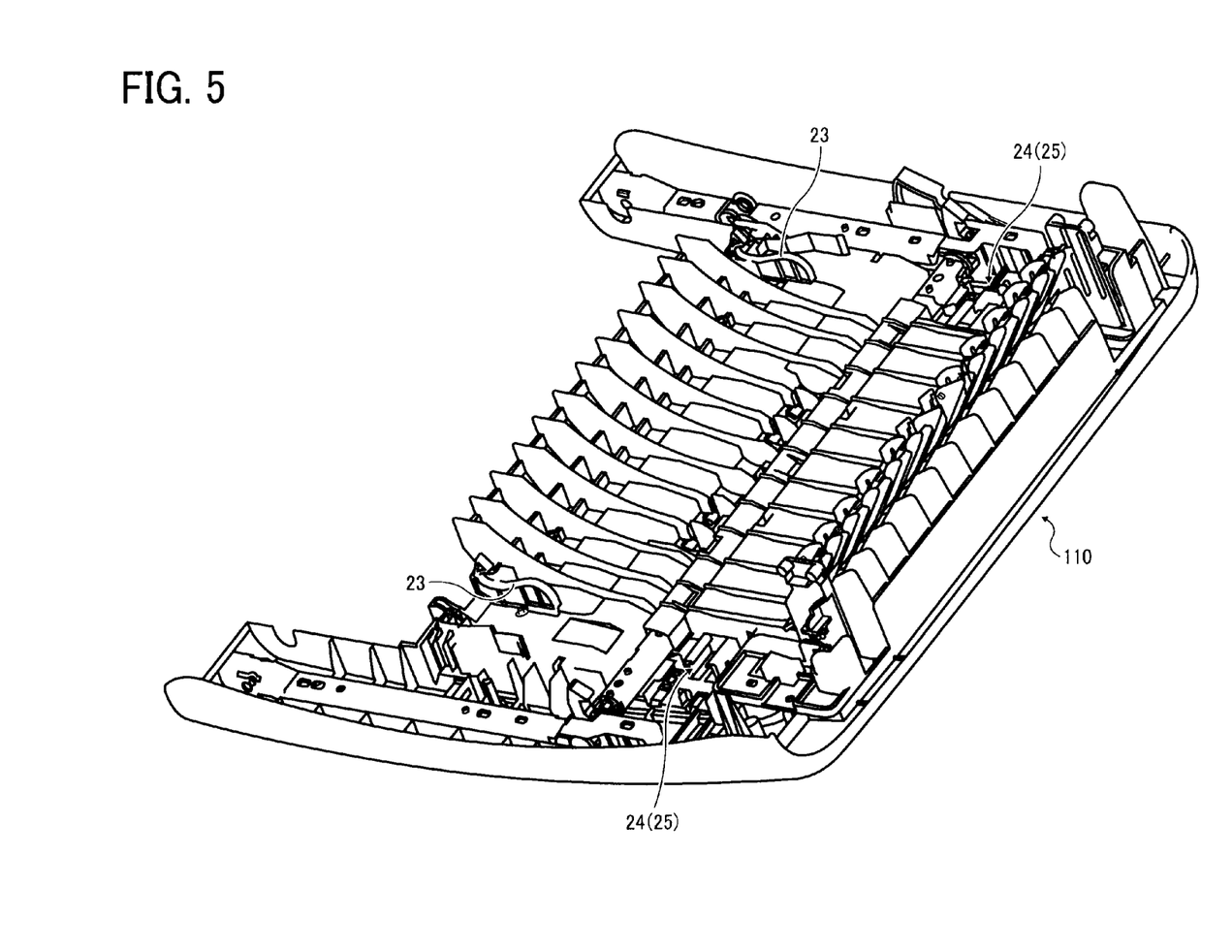

FIGS. 4 and 5 are perspective views showing the front cover panel 110 with and without, respectively, the media feeder assembly 120 attached thereto using the mounting mechanism incorporated in the image forming apparatus 1000.

As shown in FIGS. 4 and 5, the cover panel 110 has a rear, pivotal edge (on the left of the drawings) shaped to accommodate the hinge 130, not shown, for pivotable connection to the bottom edge of the main apparatus body 100. The cover panel 110 has a pair of distal holders 23 and a pair of proximal fasteners 24 disposed on its inner side, the former relatively closer to the pivotal edge and the latter relatively further from the pivotal edge. The holders 23 hold the assembly 120 on the cover panel 110, and the fasteners 24 fasten the assembly 120 in place on the cover panel 110.

With specific reference to FIG. 4, the fasteners 24 comprise a pair of locking members 25 that can slide along the panel surface in a transverse direction (i.e., orthogonal to the front/rear direction) to lock and release a pair of complementary locking members or flanges 120a disposed on opposing sides of the media feeder assembly 120. Note that the perspective view of FIG. 4 does not show the holders 23, which fit within an enclosure of the assembly 120 and remain unexposed to the outside when the assembly 120 is in position on the cover panel 110.

In various embodiments described hereinbelow, the two sides of the mounting mechanism coupling the media feeder assembly 120 to the front cover panel 110 are substantially symmetrical to each other, each with the holder 23 and the fastener 24 designed in a substantially identical configuration. For simplicity, the following discussion primarily focuses on the mounting mechanism provided on the left side of the apparatus body 100 using several cut-away and cross-sectional views taken along line A-A of FIG. 4.

Figure 6:
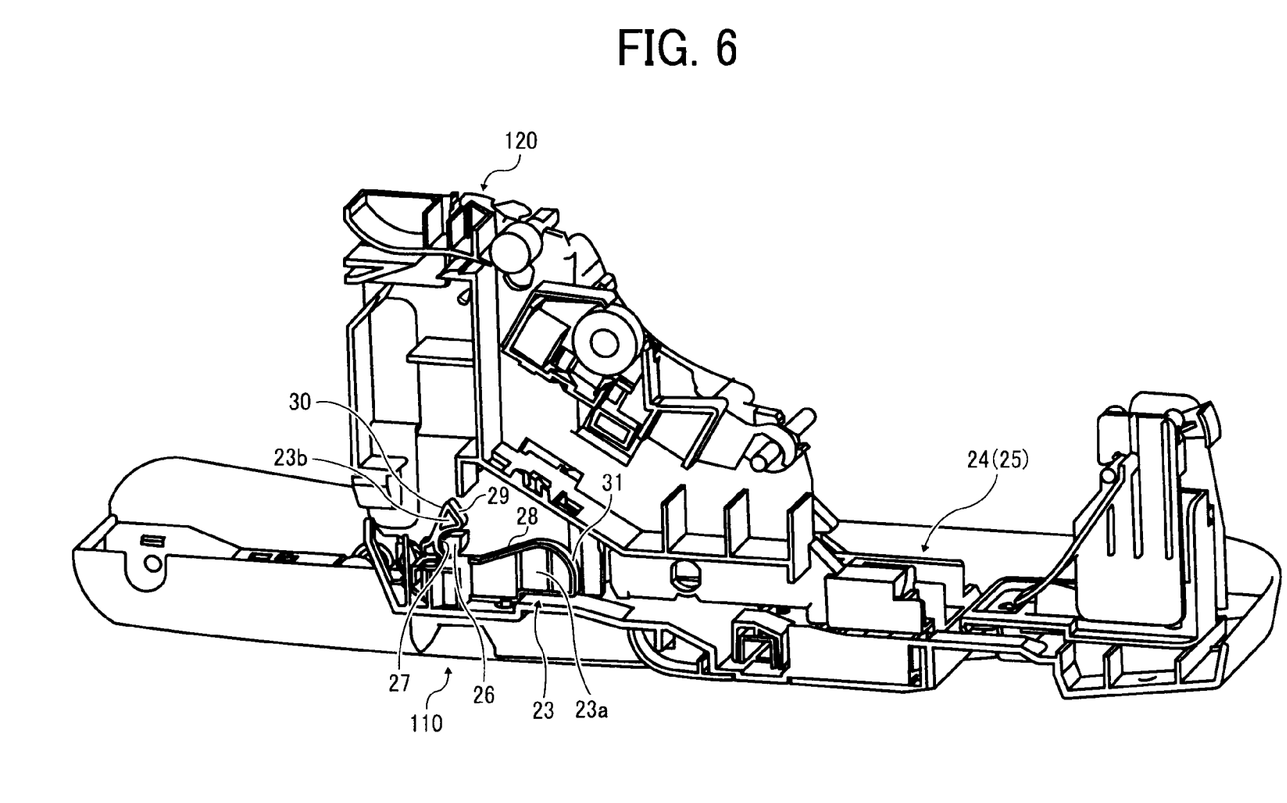
FIG. 6 is a partially cut-away perspective view of the mounting mechanism with a holder holding the media feeder assembly on the front cover panel.

FIG. 6 is a partially cut-away perspective view of the mounting mechanism with the holder 23 holding the media feeder assembly 120 on the front cover panel 110.

As shown in FIG. 6, the holder 23 has a body portion 23a and a hook portion 23b integrated into a single integral piece preferably made of low-friction material such as polyacetal. The body portion 23a and the hook portion 23b define a positioning surface or cavity 27 therebetween to accommodate a positioning pin 26 formed on each side of the media feeder assembly 120, as well as various guide surfaces to guide the positioning pin 26 relative to the positioning cavity 27 during mounting of the assembly 120.

Specifically, with the front cover panel 110 inclined open, the body portion 23a has a lower edge attached to the surface of the cover panel 110, an upper edge defining a downward-sloping first guide surface 28 sloping rearward to the positioning cavity 27, and a side edge continuous with the upper edge and defining a convexly curved, fourth guide surface 31 separated from the positioning cavity 27 by the first guide surface 28.

The hook portion 23b projects upward from the body portion 23a and can be elastically displaced relative to the body portion 23a. The hook portion 23b defines a downward-sloping second guide surface 29 sloping forward to the positioning cavity 27, and a third guide surface 30 separated from the positioning cavity 27 by the second guide surface 29 and sloping rearward to the side opposite the positioning cavity 27.

During mounting of the assembly 120 to the cover panel 110, the first and second guide surfaces 28 and 29, disposed on opposite sides of the positioning cavity 27, each serves to slidably guide the positioning pin 26 downward into the positioning cavity 27. Where appropriate, the third guide surface 30 may slidably guide the positioning pin 26 away from the second guide surface 29 for distancing it from the positioning cavity 27. Also, the fourth guide surface 31 may be used to slidably introduce the positioning pin 26 onto the first guide surface 28 for subsequent sliding into the positioning cavity 27.

Figure 7:
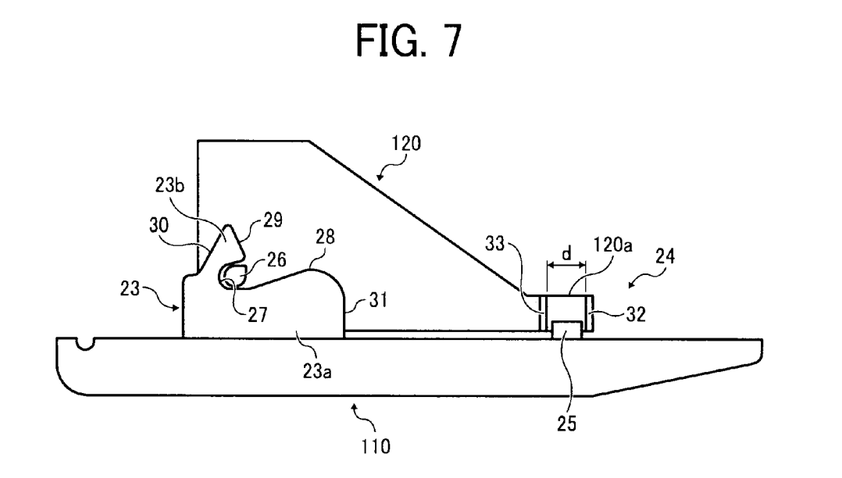
FIG. 7 is a cross-sectional view schematically illustrating the mounting mechanism with a fastener having a locking member engaged with a flange.

FIG. 7 is a cross-sectional view schematically illustrating the mounting mechanism with the fastener 24 having the locking member 25 engaged with the flange 120a.

As shown in FIG. 7, the flange 120a has a pair of first and second ribs 32 and 33 spaced apart from each other by a distance d slightly greater than the width of the locking member 25. Fitting the locking member 25 between the ribs 32 and 33 locks the fastener 24, which restricts movement of the assembly 120 along the surface of the cover panel 110.

The assembly 120 thus fastened to the cover panel 110 has a certain play or space in which to move between the front and rear sides of the cover panel 110, which is restricted by the ribs 32 and 33 interfering with sides of the locking member 25. Additionally, the assembly 120 may also have a certain space for movement away from and toward the cover panel 110 (i.e., between top and bottom in FIG. 7), of which a detailed description is omitted for brevity. Providing such play allows for precisely positioning the assembly 120 by bringing it into contact with the interior of the main apparatus body 100 as the cover panel 110 closes.

Figure 8A:
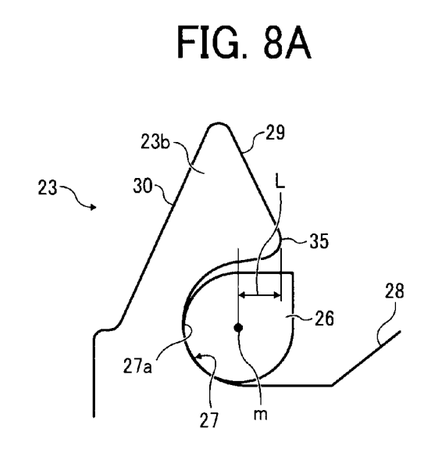
FIGS. 8A and 8B are enlarged cross-sectional views schematically illustrating the holder with a positioning pin engaged in a positioning cavity.
Figure 8B:
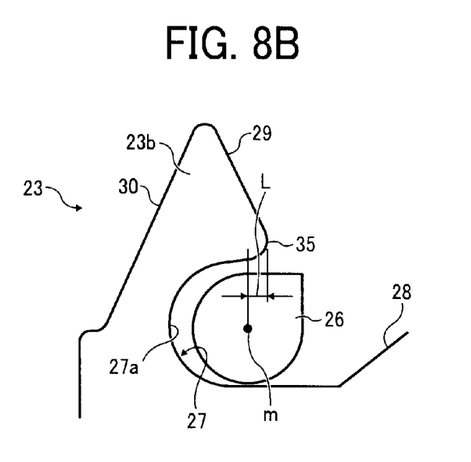

FIGS. 8A and 8B are enlarged views schematically illustrating the holder 23 with the positioning pin 26 engaged in the positioning cavity 27.

As shown in FIGS. 8A and 8B, the positioning pin 26 may move with respect to an interior surface or floor 27a of the cavity 27 as the assembly 120 held and fastened in place moves slightly rearward and forward over the surface of the cover panel 110 owing to the play between the flange 120a and the locking member 25. Thus, after mounting the assembly 120 to the cover panel 110, shifting the assembly 120 to the rear side moves the positioning pin 26 to an innermost position contacting the floor 27a of the positioning cavity 27 (FIG. 8A), and shifting the assembly 120 to the front side moves the positioning pin 26 to an outermost position away from the floor 27a of the positioning cavity 27 (FIG. 8B).

Preferably, the positioning pin 26 has a cross-sectional midpoint m remaining inward from an edge 35 of the positioning cavity 27 when the assembly 120 is held and fastened in place on the cover panel 110. That is, when the positioning pin 26 is engaged within the positioning cavity 27 and the locking member 25 is engaged with the flange 120a, an offset or distance L from the pin midpoint m to the cavity edge 35 (which can be defined as the length of a perpendicular line drawn from the midpoint m to an imaginary plane of the cavity edge 35) falls within a range greater than 0 millimeter and smaller than 1 millimeter.

Figure 9:
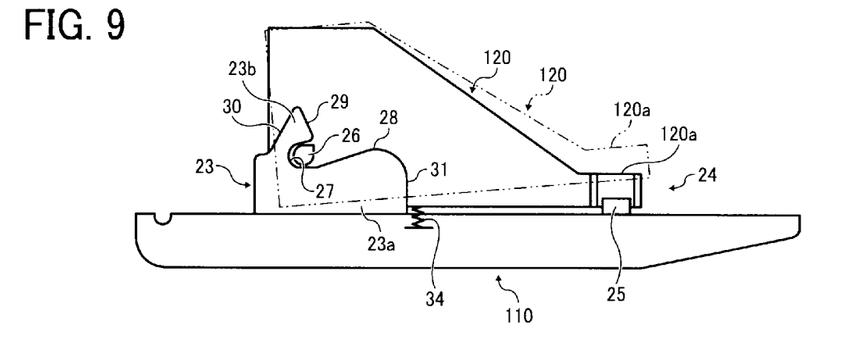
FIG. 9 is another cross-sectional view of the mounting mechanism with a biasing member to bias the media feeder assembly away from the cover panel.

FIG. 9 is another cross-sectional view of the mounting mechanism, provided with a biasing member 34 to bias the media feeder assembly 120 away from the cover panel 110 to assist in removal of the media feeder assembly 120.

As shown in FIG. 9, the biasing member 34 is a compression coil spring attached to the side of the assembly 120 facing the surface of the cover panel 110. When the locking member 25 and the flange 120a are disengaged during dismounting of the assembly 120 from the cover panel 110, the biasing force exerted from the spring 34 separates the assembly 120 from the cover panel 100 with the released end of the assembly 120 swinging upward on a rotational axis defined by the positioning pin 26 engaged in the positioning cavity 27 of the holder 23.

Preferably, the biasing spring 34 is positioned close to the positioning pin 26 to allow for a small size and low cost of the spring 34 without compromising its biasing function. Further, the biasing member 34 may be any suitable spring instead of a compression coil spring, such as a torsion coil spring or a leaf spring, and may be disposed on the cover panel 110 instead of on the media feeder assembly 120.

Having described the basic configuration, the following describes procedures by which a user of the image forming apparatus 1000 can mount the process assembly 120 to the cover panel 110 using the mounting mechanism according to this patent specification.

Figure 10A:
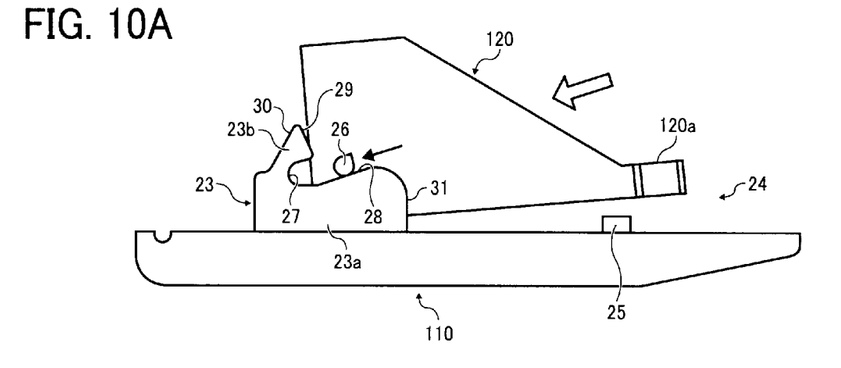
FIGS. 10A and 10B schematically illustrate one possible procedure for mounting the media feeder assembly to the front cover panel.
Figure 10B:
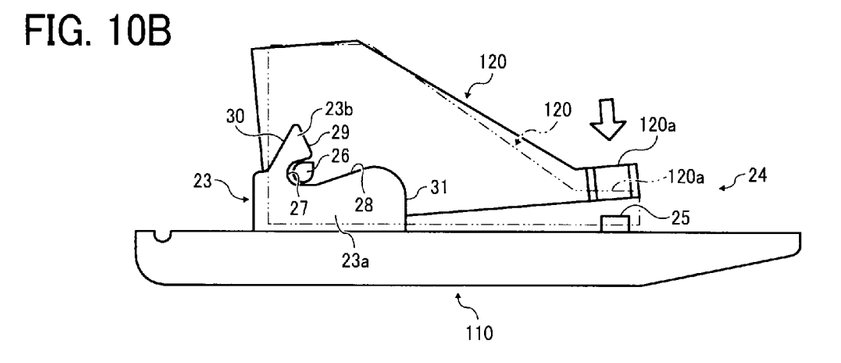

FIGS. 10A and 10B schematically illustrate one possible procedure for mounting the media feeder assembly 120 to the front cover panel 110.

Initially, a user of the image forming apparatus 1000 (who is assumed to be on the front side of the apparatus body 100) opens the cover panel 110 by inclining it toward himself. Then, the user holds the assembly 120 with one hand on each side, places it onto the cover panel 110 with the positioning pins 26 contacting the first guide surfaces 28 of the corresponding side holders 23, and moves it rearward by sliding the positioning pins 26 along the first guide surfaces 28 into the positioning cavities 27 (FIG. 10A).

With the positioning pins 26 engaged in the positioning cavities 27 to define a rotational axis, the user swings the assembly 120 downward against the biasing force exerted by the biasing spring 34 to engage the flanges 120a with the corresponding locking members 25 (FIG. 10B).

Thus, mounting the assembly 120 to the cover panel 110 is accomplished, as the holders 23 and the fasteners 24 both are properly secured with the positioning pins 26 engaged in the positioning cavities 27 and the flanges 120a engaged with the locking members 25. Such mounting is ready and less cumbersome since the first guide surfaces 28 sloping down toward the positioning cavities 27 allows for smoothly sliding the assembly 120 into the intended position by gravity, leading to increased usability of the mounting mechanism of the image forming apparatus 1000.

With mounting of the assembly 120 to the cover panel 120a completed, the user then closes the cover panel 110 (see FIG. 3). As mentioned above, turning the cover panel 110 into the closed position establishes direct and/or indirect contact between the media feeder assembly 120 and the interior of the apparatus main body 100 (e.g., holding the secondary transfer roller 12 against the driver roller 8 through the intermediate transfer belt 8), which properly positions the respective components of the media feeder assembly 120 relative to the associated parts of the image forming apparatus 1000.

Optionally, it is possible to label the assembly 120 and the cover panel 110 with marks or numerals indicating a correct procedure (such as one described above) to be followed by a user when mounting the assembly 120 to the cover panel 110. For example, a set of sequential numbers may be provided on corresponding portions of the assembly 120 and the cover panel 110, such as "1" on each of the positioning pins 26 and the positioning cavities 27 and "2" on each of the flanges 120a and the locking members 25, so as to be visible through the opening O to allow a user to mount the assembly by matching portions assigned the same sequential number.

To dismount the assembly 120 from the cover panel 110, a user may reverse the mounting procedure depicted above. Initially, the user opens the cover panel 110 and disengages the locking members 25 from the flanges 120a. With the spring 34 biasing the assembly 120 away from the cover panel 110 as described in FIG. 9, releasing the fasteners 24 causes the assembly 120 to swing upward around the rotational axis defined by the positioning pins 26 held in the positioning cavities 27, so that the user can readily handle the assembly 120 during dismounting from the cover panel 110.

Thereafter, the user holds the assembly 120 with one hand on each side, draws it frontward to disengage the positioning pins 26 from the positioning cavities 27, and ultimately removes it from the cover panel 110 to complete dismounting of the assembly 120.

Figure 11:
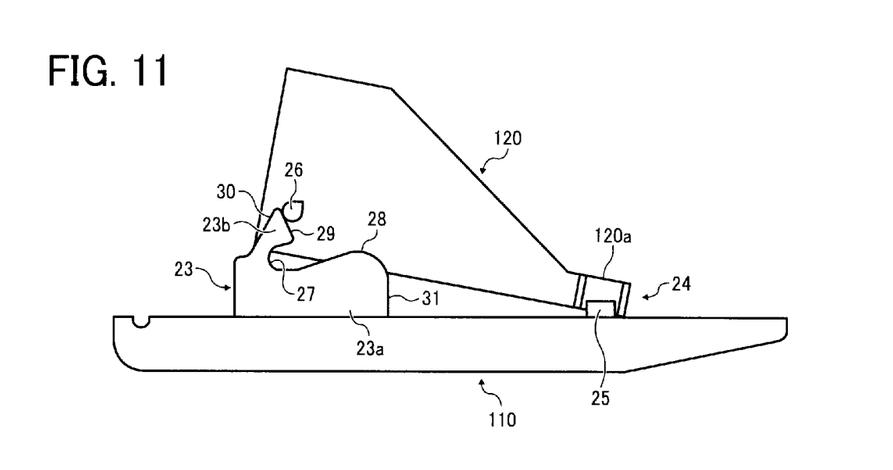
FIG. 11 schematically illustrates another possible procedure for mounting the media feeder assembly to the front cover panel.

FIG. 11 schematically illustrates another possible procedure for mounting the media feeder assembly 120 to the front cover panel 110.

As shown in FIG. 11, a user may engage the locking members 25 with the flanges 120a to fasten the assembly 120 without engaging the positioning pins 26 in the positioning cavities 27. Once the assembly 120 is connected to the cover panel 110 by the fasteners 24, the user can close the cover panel 110 even where the assembly 120 is not completely attached with the positioning pins 26 lying on the second guide surfaces 29 and not within the positioning cavities 27.

In such cases, pressing the cover panel 110 toward the apparatus body 100 during closure presses the assembly 120 against the interior of the apparatus body 100 as well as against the cover panel 110. This causes the positioning pins 26 to slide and press against the second guide surfaces 29 due to pressure acting on the assembly 120 to force it against the cover panel 110.

Figure 12:
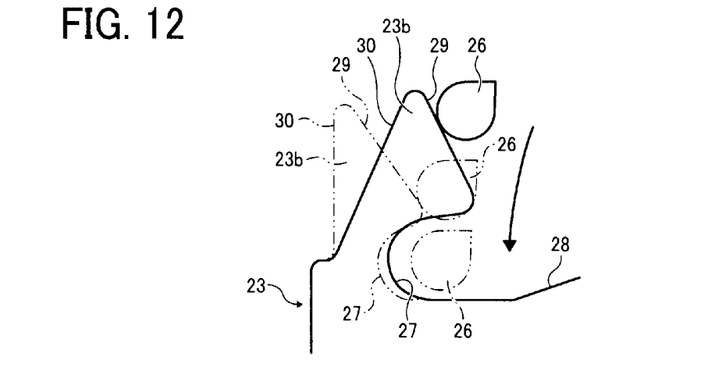
FIG. 12 is an enlarged cross-sectional view of the holder during closure of the cover panel.

FIG. 12 is an enlarged cross-sectional view of the holder 23 during closure of the cover panel 110 as described above, shown in the same fixed orientation as in FIG. 11 for ease of illustration.

As shown in FIG. 12, as each positioning pin 26 slides and presses against the corresponding second guide surface 29 during closure of the cover panel 110, the hook portion 23b and its surface 29 is elastically displaced with respect to the body portion 23a from an original, frontward position (represented by solid lines) to a rearward position (represented by dashed lines). When the positioning pin 26 slides off the second guide surface 29, the hook portion 23b returns to the original position, restoring the positioning surface 27 to its original concave shape to accommodate the positioning pin 26 therewithin.

Thus, even when the cover panel 110 has the assembly 120 not completely attached to the cover panel 110, mounting the assembly 120 to the cover panel 110 is properly completed during closure of the cover panel 110, upon which the positioning pins 26 enter the positioning cavities 27 as the second guide surfaces 29 are elastically displaced.

Additionally, when the assembly 120 is placed as shown in FIG. 11, pressing the assembly 120 from above against the cover panel 110 instead of closing the cover panel 110 also causes the positioning pins 26 to slide and press against the second guide surfaces 29, enabling the positioning pins 26 to enter the positioning cavities 27 owing to elastic displacement of the second guide surfaces 29.

Figure 13:
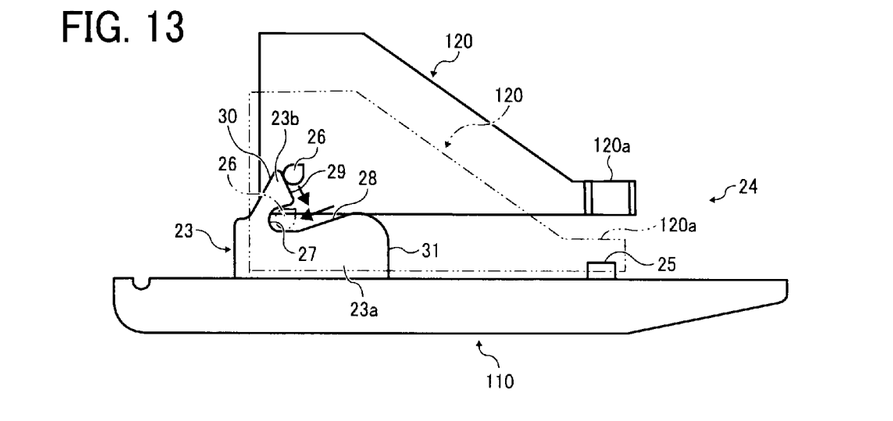
FIG. 13 schematically illustrates still another possible procedure for mounting the media feeder assembly to the front cover panel.

FIG. 13 schematically illustrates still another possible procedure for mounting the media feeder assembly 120 to the front cover panel 110.

As shown in FIG. 13, a user may initially place the assembly 120 onto the cover panel 110 with the positioning pins 26 contacting the second guide surfaces 29 instead of the first guide surfaces 28. In such cases, the user moves the assembly 120 frontward by sliding the positioning pins 26 along the second guide surfaces 29 into the positioning cavities 27, and engages the flanges 120a with the locking members 25 to complete mounting of the assembly 120.

As in the case of FIGS. 10A and 10B, such mounting is ready and less cumbersome since the second guide surface 29 sloping downward toward the positioning cavity 27 allows for smoothly sliding the assembly 120 into the intended position by gravity, leading to increased usability of the mounting mechanism of the image forming apparatus 1000.

Figure 14:
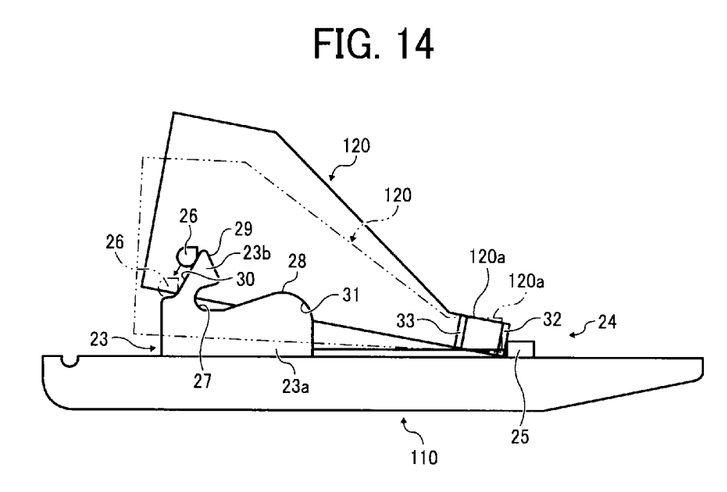
FIG. 14 shows the media feeder assembly during mounting to the cover panel with the positioning pins lying on third guide surfaces of the holders.

FIG. 14 shows the media feeder assembly 120 during mounting to the cover panel 110 with the positioning pins 26 lying on the third guide surfaces 30 of the holders 23.

As shown in FIG. 14, during mounting of the assembly 120, a user may inadvertently place the positioning pins 26 onto the third guide surfaces 30 instead of the first or second guide surfaces 28 or 29. Sloping in a direction opposite that of the second guide surfaces 29, the third guide surfaces 30 slide the positioning pins 26 away from the second guide surfaces 29 for distancing from the positioning cavities 27. This results in the assembly 120 significantly displaced relative to the proper operational position, so that the user can readily notice misplacement of the assembly 120 and correct the assembly position before closing the cover panel 110.

In addition, the fasteners 24 do not fasten the assembly 120 when the positioning pins 26 are on the third guide surfaces 30. For example, each flange 120a may have the outer rib 32 interfering with the locking member 25 as shown in FIG. 14, or may remain apart from the locking member 25, so that it cannot engage with the locking member 25 as long as the positioning pin 26 lies on the third guide surface 30. This effectively prevents improper fastening of the assembly 120 misplaced with the positioning pins 26 lying on the third guide surfaces 30.

Figure 15:
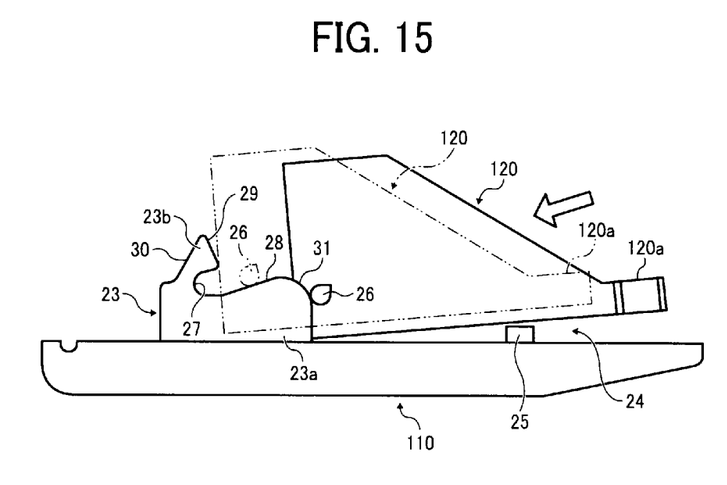
FIG. 15 shows the media feeder assembly during mounting to the front cover panel with the positioning pins held against fourth guide surfaces of the holders.

FIG. 15 shows the media feeder assembly 120 during mounting to the front cover panel 110 with the positioning pins 26 held against the fourth guide surfaces 31 of the holders 23.

As shown in FIG. 15, during mounting of the assembly 120, a user may initially place the assembly 120 on the cover panel 110 with the positioning pins 26 held against the fourth guide surfaces 31 so as to guide the positioning pins 26 initially upward along the fourth guide surfaces 31 and then downward along the first guide surfaces 28 into the positioning cavities 27. After holding the assembly 120 on the cover panel 110 with the holders 23, the user fastens the assembly 120 and closes the cover panel 110 in the manner described in FIGS. 10A and 10B to complete mounting. Using the fourth guide surfaces 31 in addition to the first guide surfaces 28 allows for smooth movement of the assembly 120 over the cover panel 110, leading to increased usability of the mounting mechanism of the image forming apparatus 1000.

Thus, the image forming apparatus 1000 according to this patent specification incorporates the mounting mechanism that enables ready mounting of the unitary assembly 120 to the openable/closable cover panel 110, wherein the first and second guide surfaces 28 and 29 provided on opposite sides of the positioning cavity 27 can guide the positioning pin 26 through a relatively large area around the holder 23 during initial placement of the assembly 120 on the cover panel 110. Providing the smoothly curved fourth guide surface 31 allows for efficient introduction of the positioning pin 26 onto the first guide surface 29, leading to enhanced usability of the mounting mechanism.

Further, the mounting mechanism according to this patent specification prevents damage to the holder 23 and the positioning pin 26 due to closing the cover panel 110 without properly fitting the positioning pin 26 into the positioning cavity 27, wherein the elastically displaceable second guide surface 29 causes the positioning pin 26 to slide off onto the positioning cavity 27 as the positioning pin 29 presses against it due to pressure acting on the assembly 120 against the cover panel 110.

For efficient functioning of the elastically displaceable surface 29 and good fitting of the positioning pin 26 in the positioning cavity 27, it is preferable that the distance from the cross-sectional midpoint m of the positioning pin 26 to the edge 35 between the positioning surface 27 and the second guide surface 35 fall within a range greater than 0 millimeter and smaller than 1 millimeter.

Still further, the mounting mechanism according to this patent specification prevents damage or malfunctioning of the image forming apparatus 1000 due to improper mounting of the unitary assembly 120 to the cover panel 110, wherein when the assembly 120 is misplaced during mounting, the third guide surface 30 can guide the positioning pin 26 away from the second guide surface 29 for distancing from the positioning surface 27 to further displace the assembly 120 from the proper operational position. Such a displacement serves as an immediate notification of the mounting failure upon which a user can correct the position of the unitary assembly 120 before closing the cover panel 110.

Still further, the mounting mechanism according to this patent specification is relatively immune to damage from external forces during use in the image forming apparatus 1000, wherein the holder 23 fits within an enclosure of the unitary assembly 120 and remains unexposed to the outside as the assembly 120 is in position on the cover panel 110.

Yet still further, the mounting mechanism according to this patent specification allows a user to open/close the cover panel 110 and attach/detach the unitary assembly 120 without moving around the apparatus body 100. Namely, as the holder 23 and the fastener 24 are located closer to and further from, respectively, the hinge 130 along which the cover panel 110 pivotably connects to the main body 100, the user can readily handle the fastener 24 approaching the user side as the cover panel 110 opens.

Additionally, the mounting mechanism according to this patent specification may have the holder 23 and the cover panel 110 formed either as a single integral piece or as separate pieces joined together during manufacture. Forming the holder 23 and the cover panel 110 as separate pieces is superior in that it requires no complicated molds and allows use of different materials to form the holder 23 and the cover panel 110, particularly where the holder 23 is molded of a low-friction and high-elasticity material.

Numerous additional modifications and variations are possible in light of the above teachings. For example, although the unitary assembly is described as a media feeder assembly mounted to a front cover panel in the embodiments depicted herein, the mounting mechanism according to this patent specification may be used with any unit or assembly (e.g., an exposure device) detachably attached to an openable/closable cover panel for installation in the image forming apparatus. It is therefore to be understood that, within the scope of the appended claims, the disclosure of this patent specification may be practiced otherwise than as specifically described herein.

What is claimed is:

1. An image forming apparatus, comprising:
a main body having an opening therein to provide access to an interior thereof;
an openable/closable cover panel to cover the opening of the main body;
a unitary assembly detachably attached to an inner side of the cover panel to settle into an operational position within the main body of the image forming apparatus by contacting the interior of the main body as the cover panel closes;
a fastener to fasten the assembly in place on the cover panel; and
a holder to hold the assembly on the cover panel,
the holder including:
a positioning surface to receive a positioning pin projecting from the assembly; and
first and second guide surfaces disposed on opposite sides of the positioning surface each to slidably guide the positioning pin onto the positioning surface,
the second guide surface being elastically displaceable to cause the positioning pin to slide off onto the positioning surface as the positioning pin presses against the second guide surface due to pressure acting on the assembly against the cover panel.

2. The image forming apparatus according to claim 1, wherein each of the first and second guide surfaces slopes down toward the positioning surface when the cover panel is open.

3. The image forming apparatus according to claim 1, wherein the holder further includes a third guide surface separated from the positioning surface by the second guide surface to slidably guide the positioning pin away from the second guide surface for distancing from the positioning surface.

4. The image forming apparatus according to claim 3, wherein the third guide surface slopes down in a direction opposite that of the second guide surface when the cover panel is open.

5. The image forming apparatus according to claim 3, wherein the fastener does not fasten the assembly when the positioning pin lies on the third guide surface.

6. The image forming apparatus according to claim 1, wherein the holder further includes a fourth guide surface separated from the positioning surface by the first guide surface to introduce the positioning pin onto the first guide surface for guiding toward the positioning surface.

7. The image forming apparatus according to claim 1, wherein the holder and the fastener are located closer to and further from, respectively, a hinge along which the cover panel pivotably connects to the main body.

8. The image forming apparatus according to claim 1, further comprising a biasing member to force the unitary assembly away from the cover panel,
wherein the assembly, once released from the fastener while still held on the cover panel by the holder, swivels away from the cover panel around the positioning pin fitted on the positioning surface.

9. The image forming apparatus according to claim 1, wherein the positioning surface comprises a cavity into which the positioning pin is fitted therein, with a distance from a cross-sectional midpoint of the positioning pin to an edge between the positioning surface and the second guide surface falling within a range greater than 0 millimeter and smaller than 1 millimeter.

10. The image forming apparatus according to claim 1, wherein the holder and the cover panel are formed as separate pieces joined together.

11. The image forming apparatus according to claim 1, wherein the holder fits within an enclosure of the unitary assembly as the assembly is in position on the cover panel.

12. The image forming apparatus according to claim 1, further comprising a set of marks provided on portions of the unitary assembly and the cover panel to indicate a procedure for mounting the unitary assembly to the cover panel.

* * * * *